United States Patent [19]
Bower

[11] 3,908,718

[45] Sept. 30, 1975

[54] VAPOUR RECOVERY SYSTEMS OF LIQUID FUEL STORAGE

[75] Inventor: Allen M. Bower, Conneaut, Ohio

[73] Assignee: Emco Wheaton Inc., Conneaut, Ohio

[22] Filed: June 20, 1974

[21] Appl. No.: 481,046

Related U.S. Application Data

[63] Continuation-in-part of Ser. No. 319,882, Dec. 29, 1972, abandoned.

[52] U.S. Cl. .................. 141/59; 137/267; 137/587; 137/588; 141/98; 141/295; 141/346; 251/149.9

[51] Int. Cl.² ... B65B 3/04; B67C 3/26; F16L 29/00

[58] Field of Search ......... 141/52, 59, 98, 155, 207, 141/290, 295, 326, 346–350, 382–387; 220/85 VR, 85 VS; 137/267, 587, 588, 377, 381; 251/149.9; 285/137 R

[56] References Cited

UNITED STATES PATENTS 2,802,492   8/1957   Gosselin.............................. 141/52

Primary Examiner—William R. Cline
Assistant Examiner—H. Jay Spiegel
Attorney, Agent, or Firm—Fetherstonhaugh & Co.

[57] ABSTRACT

Means for insuring that a vapour recovery system of a tank truck is operational before permitting liquid loading of a storage tank. The means consisting of coupler means in the vapour recovery line having an operating handle projecting into the path of the liquid loading line. The coupling device being of a type which will not permit movement of the operating handle unless it is connected to an adaptor of the vapour recovery line.

6 Claims, 4 Drawing Figures

VAPOUR RECOVERY SYSTEMS OF LIQUID FUEL STORAGE

This application is a continuation-in-part of United States application Ser. No. 319,882, filed Dec. 29, 1972, now abandoned.

FIELD OF INVENTION

This invention relates to improvements in pollution control systems for use in association with liquid fuel storage tanks. In particular, this invention relates to the provision of a device which compels the operator of a tank truck or the like to connect the vapour recovery system of the tank truck to the vapour tube of a fuel storage tank before it is possible for the operator to fill the storage tank with fuel.

PRIOR ART

In order to reduce the pollution caused by discharging vapour from the liquid fuel storage tank directly to atmosphere during the filling of the tank, the tank trucks used for the filling of service station tanks are now being fitted with a vapour recovery system and the fuel storage tanks have been provided with a vapour line for connection to the vapour recovery system. Unfortunately, it has been found that many of the tank truck operators simply neglect to connect the vapour hose to the vapour recovery system and, as a result, the problem of pollution of the environment during loading of these storage tanks continues to exist.

SUMMARY

The present invention, however, overcomes the difficulties of the prior art described above by providing a system wherein the operator is compelled to connect the vapour recovery system hose to the vapour line of the storage tank before he is able to open the filling tube and, furthermore, he is unable to remove the vapour recovery line while the filling tube is in use.

According to an embodiment of the present invention, there is provided a liquid fuel storage tank having a vapour tube opening outwardly therefrom for connection to a vapour recovery system of a tank truck and a filling tube opening outwardly therefrom having a filling end and closure means for closing the filling end, the vapour tube having an output end, the improvement of a coupler valve mounted on the output end of said vapour tube, the valve of the coupler being of a type which can only be opened and closed when the coupler is coupled to a vapour line and the coupler can be removed only when the coupler is closed. The valve has a valve handle projecting from the coupler for moving the valve between an open position and a closed position, the valve handle having an extent overlying the filling end of the filling tube when the valve is in a closed position so as to prevent filling of the tank when the vapour tube is not coupled to a vapour recovery system, the handle being remote from the filling end when the valve is in an open position so as to permit filling of the tank by way of the filling tube.

PREFERRED EMBODIMENT

The invention will be more clearly understood after reference to the following detailed specification read in conjunction with the drawings, wherein.

Figure 1:
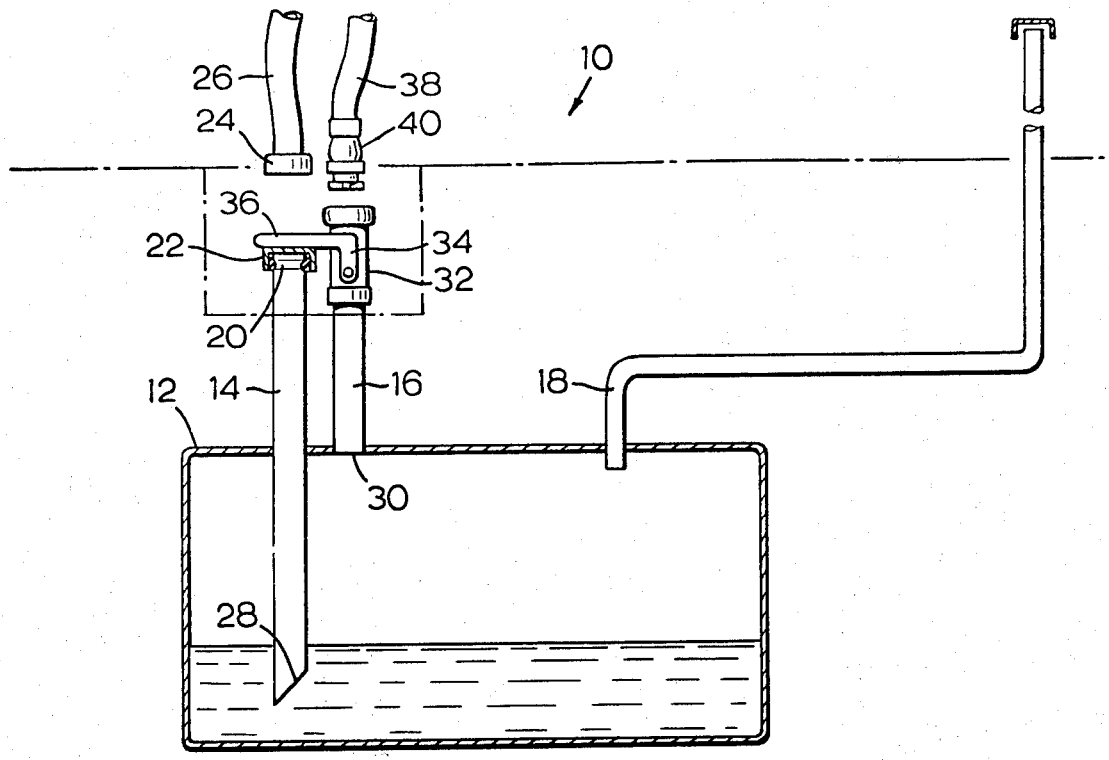
FIG. 1 is a partially sectioned diagrammatic side view of a liquid storage tank according to an embodiment of the present invention showing the coupler valve in the closed position.

With reference to the drawings, the reference numeral 10 refers generally to a liquid fuel storage tank assembly according to an embodiment of the present invention. The assembly includes a storage tank 12, a filling tube 14, a vapor recovery tube 16 and a vent-to-atmosphere tube 18.

The filling tube 14 has a filling end 20 disposed above the tank and adapted to receive a closure cap 22 and a coupler 24 attached to the end of the filling tube 26 of a tank truck as required. The discharge end 28 of the filling tube is located adjacent the lower end of the storage tank.

Figure 2:
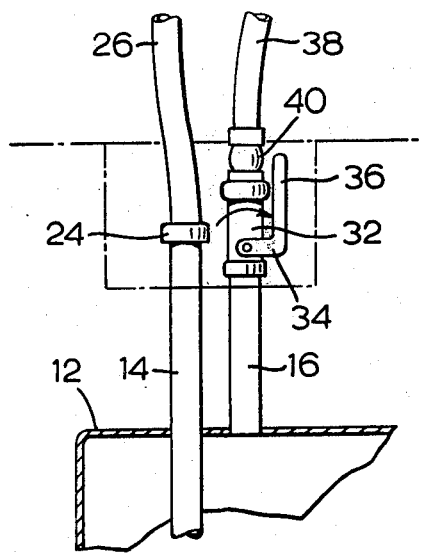
FIG. 2 is a partial view similar to FIG. 1 showing the coupler valve in the open position.

The vapour tube 16 has a lower end 30 opening through the upper end of the storage tank 12 and in fluid communication with the upper end of storage tank 12. A coupler valve 32 is mounted on the upper end of the vapour tube 16 proximate the filling end 20 of the filling tube 14. The coupler valve 32 has actuator handle 34 which has an extent 36 adapted to extend to a position overlying the closure cap of the filling end 20 of the filling tube 14 when the valve is in a closed position (FIG. 1). The handle 34 is movable to a position in which the extent 36 is remote from the filling end of the filling tube when the valve is in an open position (FIG. 2).

The valve coupler 34 is of a well known type in which the valve can only be moved to and from the open and closed position when the coupler is connected to a complementary adaptor. A suitable valve coupler is described in U.S. Pat. No. 3,168,125 dated Feb. 2, 1965 and U.S. Pat. No. 3,330,313 dated July 11, 1967.

In the embodiment of the invention illustrated, the vapour recovery line 38 of the vapour recovery system of a tank truck is provided with an adapator 40 which is adapted to be complementary to the valve coupler 32.

When the filling tube is closed with the closure cap 22 and the handle 34 in the position shown in FIG. 1 of the drawings, it is not possible to move the handle 32 away from the overlying position with respect to the closure cap 22 without first locating the complementary adaptor 40 in the free end of the coupler valve 32. As a result, the operator is forced to connect the vapour recovery system of the tank truck to the vapour recovery line of the storage tank before he is able to open the filling tube. When the complementary adaptor 40 is located in the free end of the coupler valve 32, the handle 34 may be moved to the position shown in FIG. 2 of the drawings wherein it is remote from the filling end of the filling tube. The moving of the handle 34 to the position shown in FIG. 2 causes the valve of the coupler valve to be moved to an open position placing the vapour tube 16 in fluid communication with the vapour recovery line 38. When the handle 34 is in the open position, the operator may then remove the closure cap 22 and connect the coupling 24 of the filling tube 26 to the filling end of the filling tube 14. When the filling operation is in progress, the operator cannot disconnect the vapour recovery system or prevent fluid communication between the vapour tube 16 and the vapour recovery line due to the fact that it is not possible for the operator to move the handle 34 to the closed position to permit the adaptor 40 to be disconnected due to the fact that the filling tube 26 obstructs the movement of the handle 34 to the closed position.

When the filling operation has been completed, the operator disconnects the coupling 24, replaces the cap 22 and moves the handle 34 to the closed position with the extent 36 overlying the closure cap so as to permit the adaptor 40 to be disconnected to release the vapour recovery line. It will be noted that this system has the added advantage that the operator must close the filling tube and it is not, therefore, possible for the operator to accidentally leave the filling tube open at the filling operation.

Figure 3:
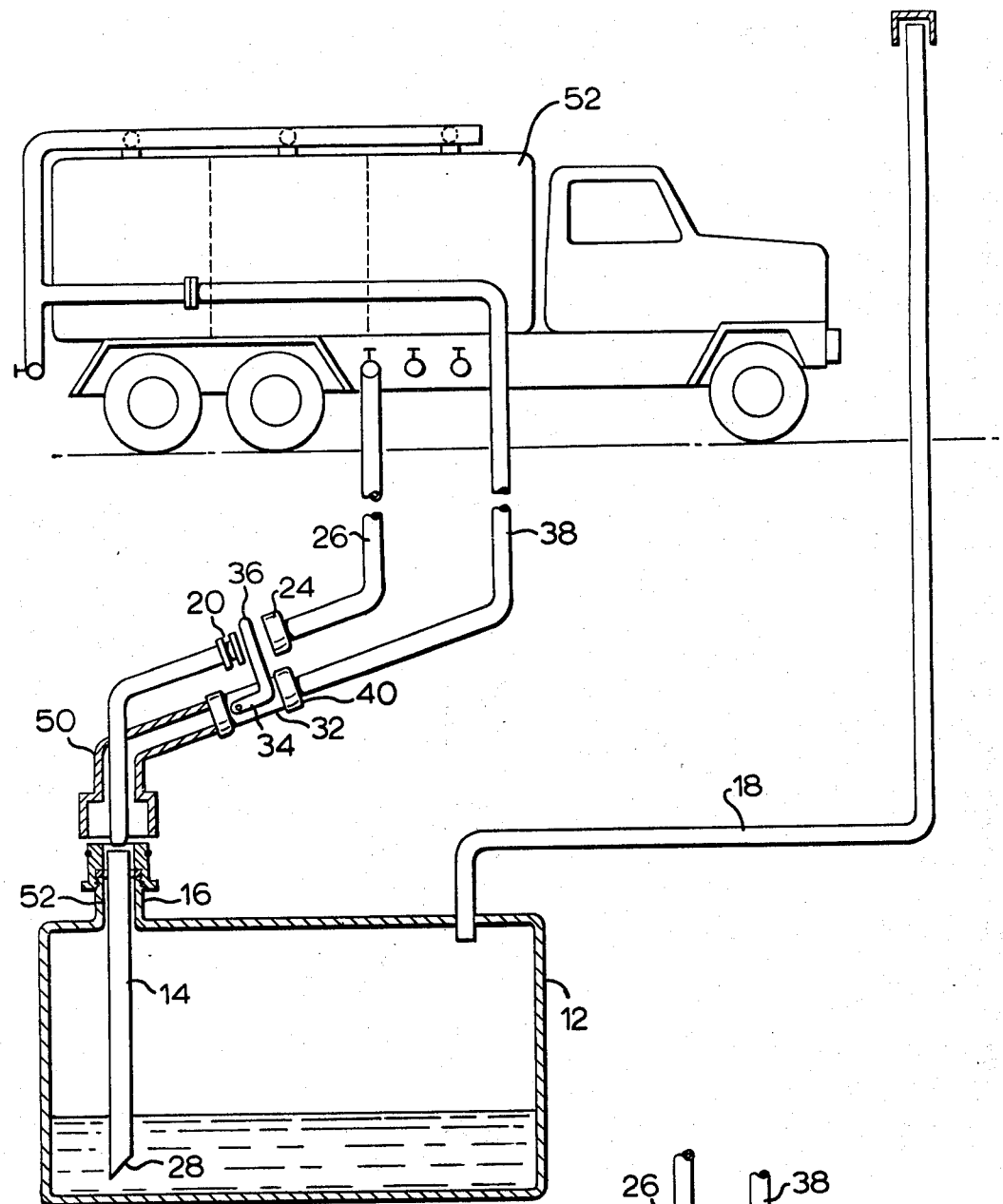
FIG. 3 is a view similar to FIG. 1 illustrating a further embodiment of this invention.
Figure 4:
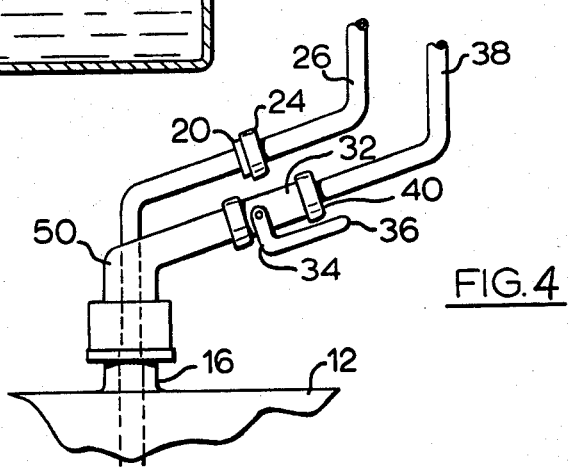
FIG. 4 is an enlarged detail view of the device of FIG. 3 in the coupled position.

An alternative embodiment of the present invention is illustrated in FIGS. 3 and 4 of the drawings wherein a coaxial fitting generally identified by the reference numeral 50 is connectable at one end to a coaxial filling and vapour tube assembly 52 projecting from the storage tank 12 and at the other end to filling hose 26 and vapour hose 38. A coupler valve 32 of the type previously described is mounted at the input end of the vapour recovery line of the adaptor 50 and provided with a handle 36 which is adapted to project over the end of the fuel input line of the adaptor in a manner similar to the manner in which the handle 36 projects over the end of the filling tube 40 of the embodiment illustrated in FIG. 1. It will be noted that it is not possible to move the handle away from the position overlying the end of the fuel input line until the adaptor 40 of the vapour recovery line 38 is positioned within the coupler 32. Thereafter the handle 36 may be moved away from the position in which it prevents completion of liquid fuel filling line.

The advantage of the system illustrated in FIG. 3 of the drawings is that it provides a coaxial fitting which may be transported with the tank truck so that one fitting may be used to achieve the required goal of insuring that the vapour recovery system is operational prior to filling of the tank truck.

Due to the fact that the operator must connect the vapour recovery system to the vapour line of the storage tank before filling of the storage tank can be effected, the operator is prevented from polluting the environment by failure to connect the vapour recovery system.

A further advantage of the present invention is that it prevents the unauthorized removal of the closure cap of a filling tube of a storage tank.

These and other advantages of the apparatus of the present invention will be apparent to those skilled in the art.

Whereas in the preferred embodiment the applicant makes reference to valve coupler 34, it will be apparent that it is the coupler function of this device which is important to the present invention and not its valve function. Clearly, the valve component of the coupler may be removed without preventing the device from operating effectively to prevent connection of the fill line of the tank truck when the vapour recovery line is not correctly coupled.

What I claim as my invention is:

1. In a system for loading a liquid fuel storage tank having a vapour recovery line opening outwardly therefrom for connection to a vapour recovery line of a vapour recovery system and a filling line opening outwardly therefrom for connection to a filling line of a tank truck, the improvement comprising coupler means interposed between said vapour recovery line of said storage tank and vapour recovery line of said vapour recovery system, said coupler means including a coupler mechanism which is movable between an operative coupling position and an inopertive release position only when the coupler is engaged by a vapour recovery line of said vapour recovery system, and handle means projecting from said coupler mechanism for moving said coupler mechanism between said operative and inoperative positions, said handle means having an extent adapted to project into the path of said filling line at a break in said line when said coupler means is in a closed position so as to prevent the filling of said tank when said vapour recovery lines are uncoupled and said handle being remote from said break in said filling line when said coupler means is in said operative position thereby permitting said tank to be filled by way of said filling tube.

2. System for loading liquid fuel as claimed in claim 1 wherein said coupler means is incorporated in a coaxial liquid-vapour fitting transportable with a tank truck, said storage tank having coaxial filling tube and vapour recovery line opening outwardly therefrom.

3. In a liquid fuel storage tank having a vapour recovery tube opening outwardly therefrom for connection to a vapour recovery system and a filling tube opening outwardly therefrom for connection to a filling line of tank truck, the filling tube having a filling end and closure means for closing the filling end of said filling tube, said vapour recovery tube having an outward end, the improvements of
   a. a coupler valve mounted on said outward end of said vapour recovery tube, said coupler valve being of a type which can only be opened and closed when the coupler is coupled to a vapour line of a vapour recovery system,
   b. a valve handle means projecting from said coupler for moving said valve between an open position and a closed position,
   c. said valve handle means having an extent disposed closely adjacent said filling end when said valve is in a closed position so as to prevent connection of said filling line of a tank truck to said filling tube of said storage tank to prevent filling of said tank when said vapour tube is not in fluid communication with the vapour recovery system, said handle being remote from said filling end when said valve is in said open position thereby permitting said tank to be filled by way of said filling tube.

4. A liquid fuel storage means comprising,
   a. a liquid fuel storage tank,
   b. a filling tube mounted on said tank and having a filling end disposed above said tank and a discharge end disposed inwardly of said tank,
   c. a releasable closure cap means for closing the filling end of said filling tube,
   d. a vapour tube having an input end opening into said tank and an output end disposed proximate the filling end of said filling tube,
   e. a coupler valve in fluid communication with the output end of said vapour tube, said coupler valve being of a type which can only be opened and closed when the coupler is coupled to a vapour line of a vapour recovery system, f. valve handle means projecting from the coupler for moving the valve between an open position and a closed position, g. said valve handle means having an extent overlying said filling end of said filling tube when said valve is in a closed position so as to prevent filling of the tank when said vapour tube is not coupled to a vapour recovery system, said handle being remote from the filling end of said filling tube when said valve is in said open position.

5. A liquid fuel storage means comprising, a. a liquid fuel storage tank, b. a filling tube mounted on said tank and having a filling end disposed above said tank and a discharge end disposed inwardly of said tank, c. a releasable closure cap means for closing the filling end of said filling tube, d. a vapour tube having an input end opening into said tank and an output end disposed proximate the filling end of said filling tube, e. a coupler member in fluid communication with the output end of said vapour tube, said coupler member including means for sealingly engaging a vapour recovery line of a vapour recovery system, f. handle means projecting from the coupler member and cooperating with said means for sealingly engaging a vapour recovery line to be movable from a first position to a second position only when said coupler member is coupled for sealing engagement with a vapour recovery line, g. in said first position said handle means having an extent disposed closely adjacent said filling end of said filling tube to prevent filling of said tank by way of said filling tube when said coupler member is not sealingly coupled to a vapour recovery line, said handle being remote from the filling end of said filling tube to permit filling of said tank when in said second position in which said coupler member is sealingly coupled to a vapour recovery line.

6. A nozzle for use in a system for loading liquid fuel storage tanks from tank trucks wherein the storage tank and tank truck each have a vapour recovery line opening outwardly therefrom, and a filling line opening outwardly therefrom, said nozzle comprising a. liquid conduit means having an input end directable to the liquid filling line of a tank truck and an output end connectible to a liquid filling line of a storage tank, b. vapour recovery conduit means having an input end and an output end, said output end being connectible to the vapour recovery line of a storage tank, c. coupler means at said input end of said vapour recovery conduit means movable between a first release position and a second sealing position only when coupled to a vapour recovery line of a tank truck, d. handle means projecting from said coupler means for moving said coupler means between said inoperative and said operative positions, said valve handle means having an extent adapted to project to a position closely adjacant said input end of said liquid conduit means when said coupler is in said first inoperative position to prevent fluid communication between the liquid fill line of said tank truck and said input end of said conduit means when said coupler means is in said first position, said handle being remote from said input end of said liquid conduit means when in said second position to permit connection of said liquid conduit means and said liquid fill line of said tank truck.

* * * * *